(12) United States Patent
Yoshizawa et al.

(10) Patent No.: US 10,237,495 B2
(45) Date of Patent: Mar. 19, 2019

(54) IMAGE PROCESSING APPARATUS, IMAGE PROCESSING METHOD AND STORAGE MEDIUM

(71) Applicant: CASIO COMPUTER CO., LTD., Shibuya-ku, Tokyo (JP)

(72) Inventors: Kenji Yoshizawa, Ome (JP); Naoya Okamoto, Fussa (JP); Hitoshi Tanaka, Hamura (JP); Kazunori Yanagi, Akishima (JP); Kazuaki Hagiwara, Koshigaya (JP); Yoshihiro Takayama, Tokyo (JP); Yoshiyuki Kato, Higashiyamoto (JP); Tomohiko Murakami, Musashino (JP); Ken Fujita, Mitaka (JP); Kenji Iwamoto, Kokubunji (JP); Takashi Onoda, Ome (JP); Genki Kumazaki, Chofu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/437,486

(22) Filed: Feb. 21, 2017

(65) Prior Publication Data
US 2017/0264832 A1    Sep. 14, 2017

(30) Foreign Application Priority Data
Mar. 14, 2016  (JP) .................................. 2016-049151

(51) Int. Cl.
*H04N 5/232* (2006.01)
*H04N 5/262* (2006.01)
(Continued)

(52) U.S. Cl.
CPC ......... *H04N 5/2628* (2013.01); *G06K 9/6267* (2013.01); *G06T 5/006* (2013.01);
(Continued)

(58) Field of Classification Search
CPC .................................................. H04N 5/23238
(Continued)

(56) References Cited

U.S. PATENT DOCUMENTS

| 9,607,358 B2 * | 3/2017 | Takenaka ........... H04N 5/23238 |
| 2005/0179784 A1 * | 8/2005 | Qi ......................... H04N 5/145 |
| | | 348/208.1 |

(Continued)

FOREIGN PATENT DOCUMENTS

| JP | 2000106623 A | 4/2000 |
| JP | 2011030104 A | 2/2011 |

(Continued)

*Primary Examiner* — Anthony J Daniels
(74) *Attorney, Agent, or Firm* — Holtz, Holtz & Volek PC

(57) ABSTRACT

An image processing apparatus including a CPU which is operable to function as units comprising a processing unit which sets, as a first area, an area that is not a peripheral edge area in a captured image acquired by an imaging unit, sets an area including the peripheral edge area as a second area, and performs predetermined processing on one of the first area and the second area, and a specification unit which specifies whether the first area is subjected to the predetermined processing or the second area is subjected to the predetermined processing, based on orientation information of the imaging unit when the captured image is acquired.

19 Claims, 11 Drawing Sheets

(51) Int. Cl.

| | |
|---|---|
| *G06T 7/11* | (2017.01) |
| *G06T 7/13* | (2017.01) |
| *G06T 7/70* | (2017.01) |
| *G06K 9/62* | (2006.01) |
| *G06T 5/00* | (2006.01) |
| *G06T 7/60* | (2017.01) |

(52) U.S. Cl.
CPC ............... *G06T 7/11* (2017.01); *G06T 7/13* (2017.01); *G06T 7/60* (2013.01); *G06T 7/70* (2017.01); *H04N 5/23203* (2013.01); *H04N 5/23238* (2013.01); *H04N 5/23245* (2013.01); *H04N 5/23293* (2013.01); *G06T 2207/30244* (2013.01)

(58) Field of Classification Search
USPC .......................................................... 348/36
See application file for complete search history.

(56) References Cited

U.S. PATENT DOCUMENTS

2015/0341536 A1\* 11/2015 Huang ................. H04N 5/2328
 348/208.2
2017/0187983 A1\* 6/2017 Lawrence ................. H04N 5/92
2017/0236291 A1\* 8/2017 Balley .................... H04N 7/185
 348/144

FOREIGN PATENT DOCUMENTS

| JP | 2011114496 A | 6/2011 |
|---|---|---|
| JP | 2014220736 A | 11/2014 |

\* cited by examiner

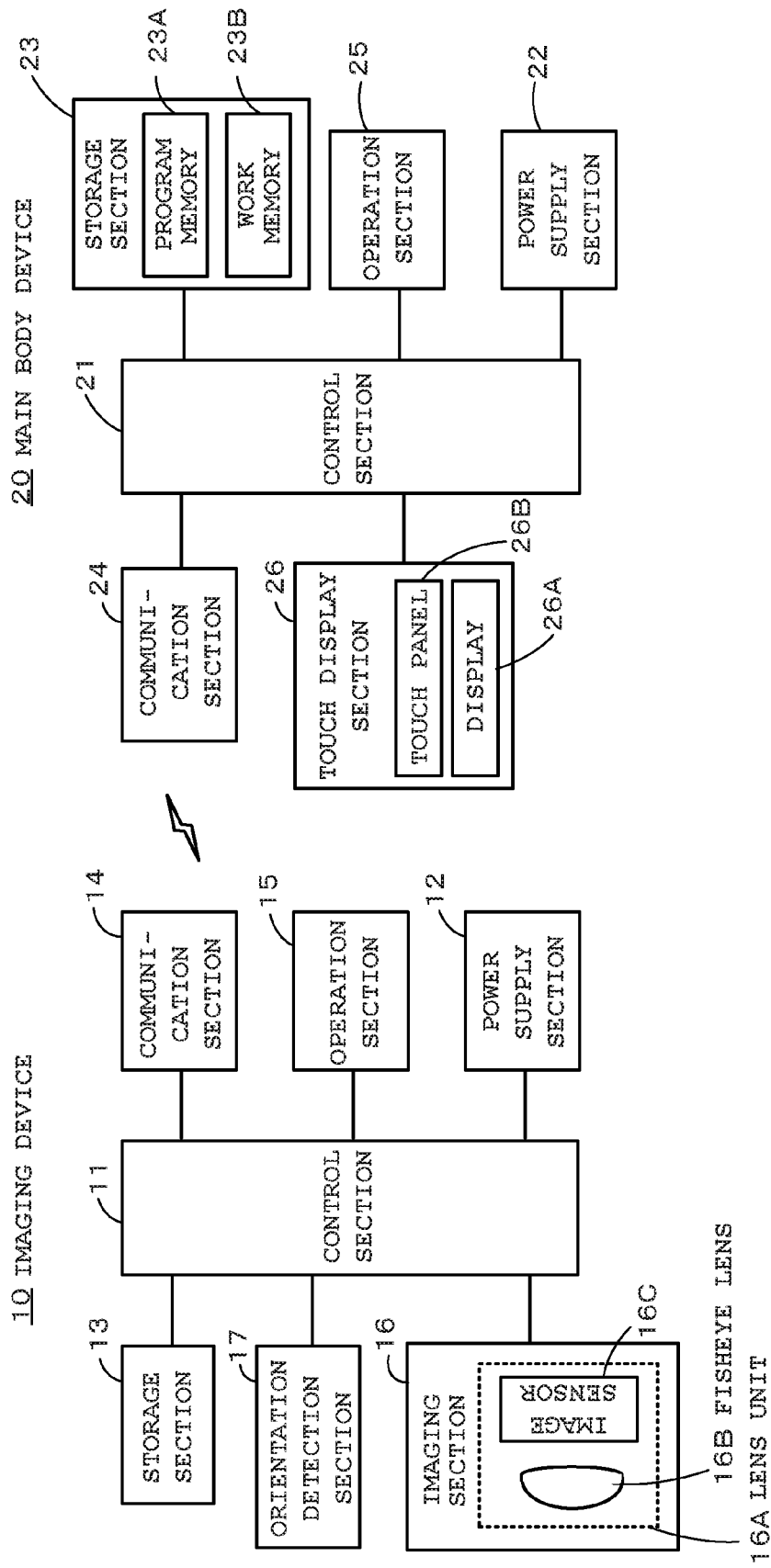

FIRST ORIENTATION

GRAVITY DIRECTION

LIVE VIEW SCREEN ON MAIN BODY DEVICE 20

RECTANGULAR FRAME FOR FIRST AREA

SECOND ORIENTATION

GRAVITY DIRECTION

LIVE VIEW SCREEN ON MAIN BODY DEVICE 20

RECTANGULAR FRAME FOR SECOND AREA

FIG. 4A

NORMAL (UPRIGHT) ORIENTATION OF CAMERA HOUSING WHEN CAMERA IS IN FIRST ORIENTATION (ORIENTATION 1-1)

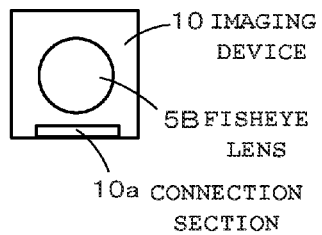

- 10 IMAGING DEVICE
- 5B FISHEYE LENS
- 10a CONNECTION SECTION

FIG. 4B
RECTANGULAR FRAME FOR FIRST AREA (FOR STANDARD SIZE DEVELOPMENT)

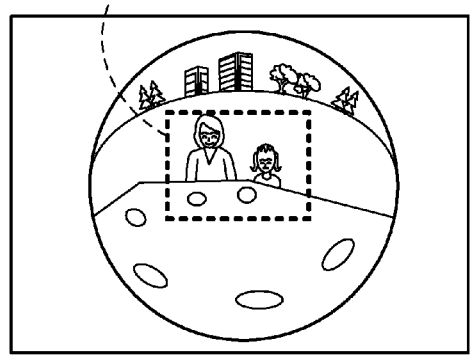

FIG. 4C

ORIENTATION OF CAMERA HOUSING WHEN HOUSING IN NORMAL ORIENTATION IS ROTATED IN CLOCKWISE DIRECTION BY 90 DEGREES (ORIENTATION 1-2)

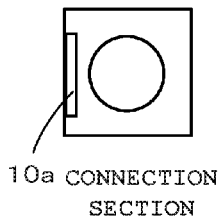

10a CONNECTION SECTION

FIG. 4D
RECTANGULAR FRAME FOR SECOND AREA (FOR ENTIRE VIEWING ANGLE DEVELOPMENT)

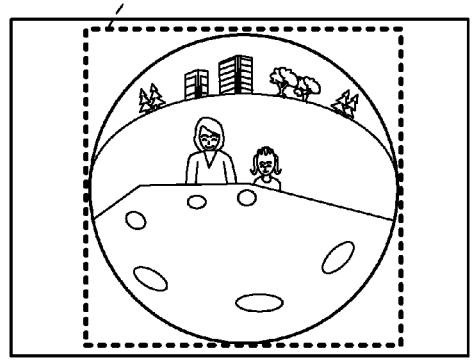

FIG. 4E

ORIENTATION OF CAMERA HOUSING WHEN HOUSING IN NORMAL ORIENTATION IS ROTATED IN COUNTERCLOCKWISE DIRECTION BY 90 DEGREES (ORIENTATION 1-3)

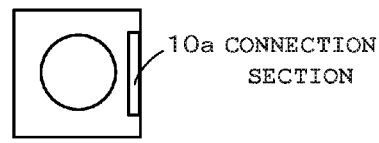

10a CONNECTION SECTION

FIG. 4F
RECTANGULAR FRAME FOR FIRST AREA (FOR PANORAMA DEVELOPMENT)

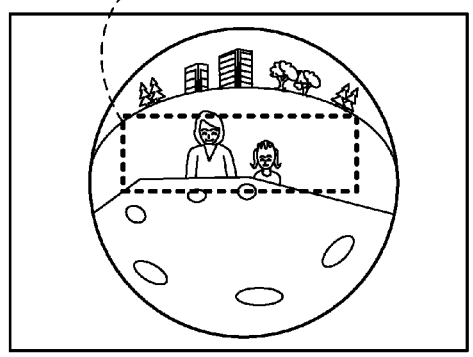

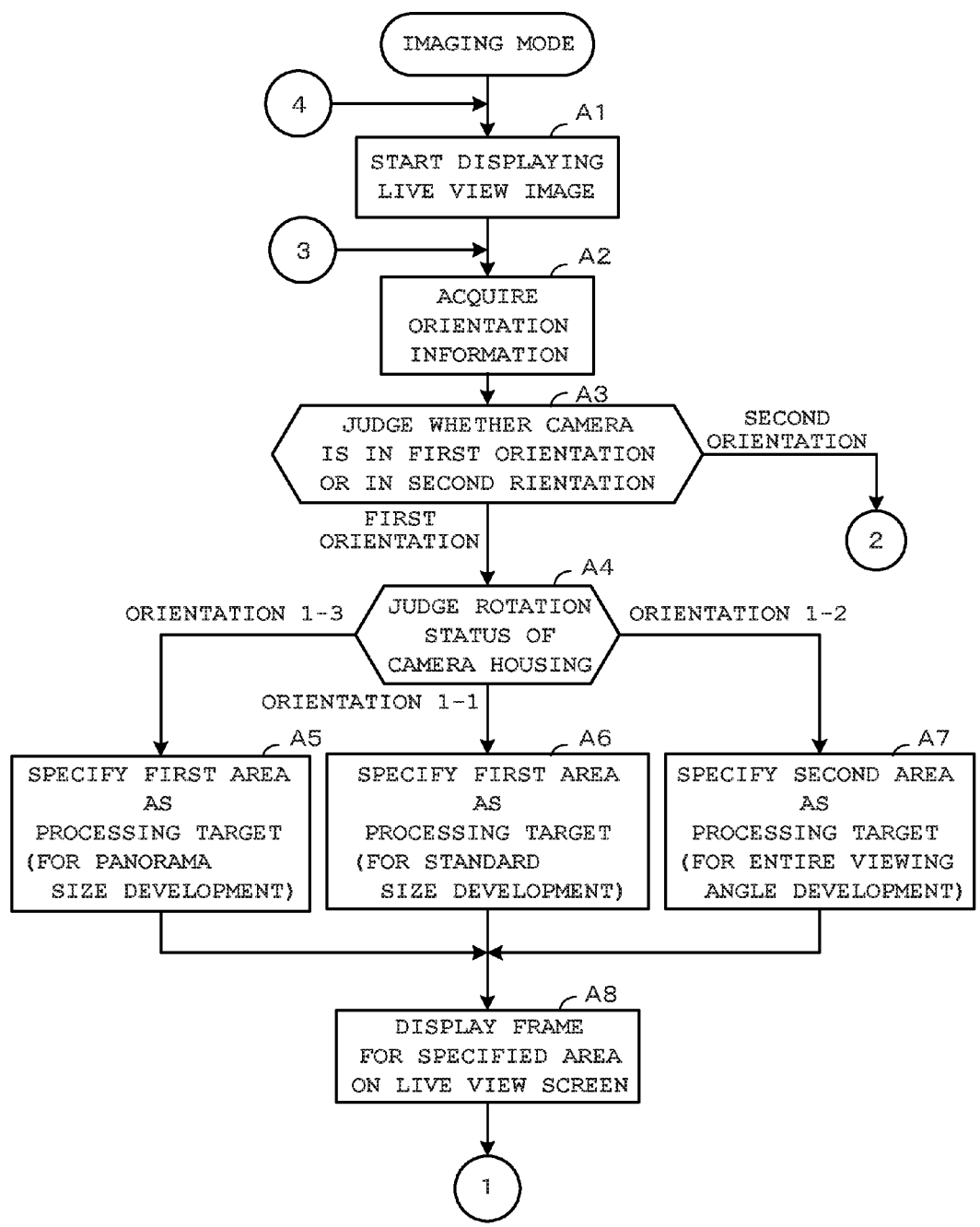

FISHEYE IMAGE CAPTURED WHEN CAMERA IS IN FIRST ORIENTATION
(CASE WHERE IMAGE CAPTURING HAS BEEN PERFORMED WITH PERSONS
BEING POSITIONED AT CENTER OF VIEWING ANGLE)

IMAGE THAT HAS BEEN CLIPPED FROM FIRST AREA,
SUBJECTED TO DISTORTION CORRECTION, AND REPLAYED

FISHEYE IMAGE CAPTURED WHEN CAMERA IS IN SECOND ORIENTATION
(CASE WHERE IMAGE CAPTURING HAS BEEN PERFORMED TO INCLUDE PERSON)

PLAYBACK SCREEN

IMAGE THAT HAS BEEN CLIPPED FROM SECOND AREA,
SUBJECTED TO DISTORTION CORRECTION, AND REPLAYED

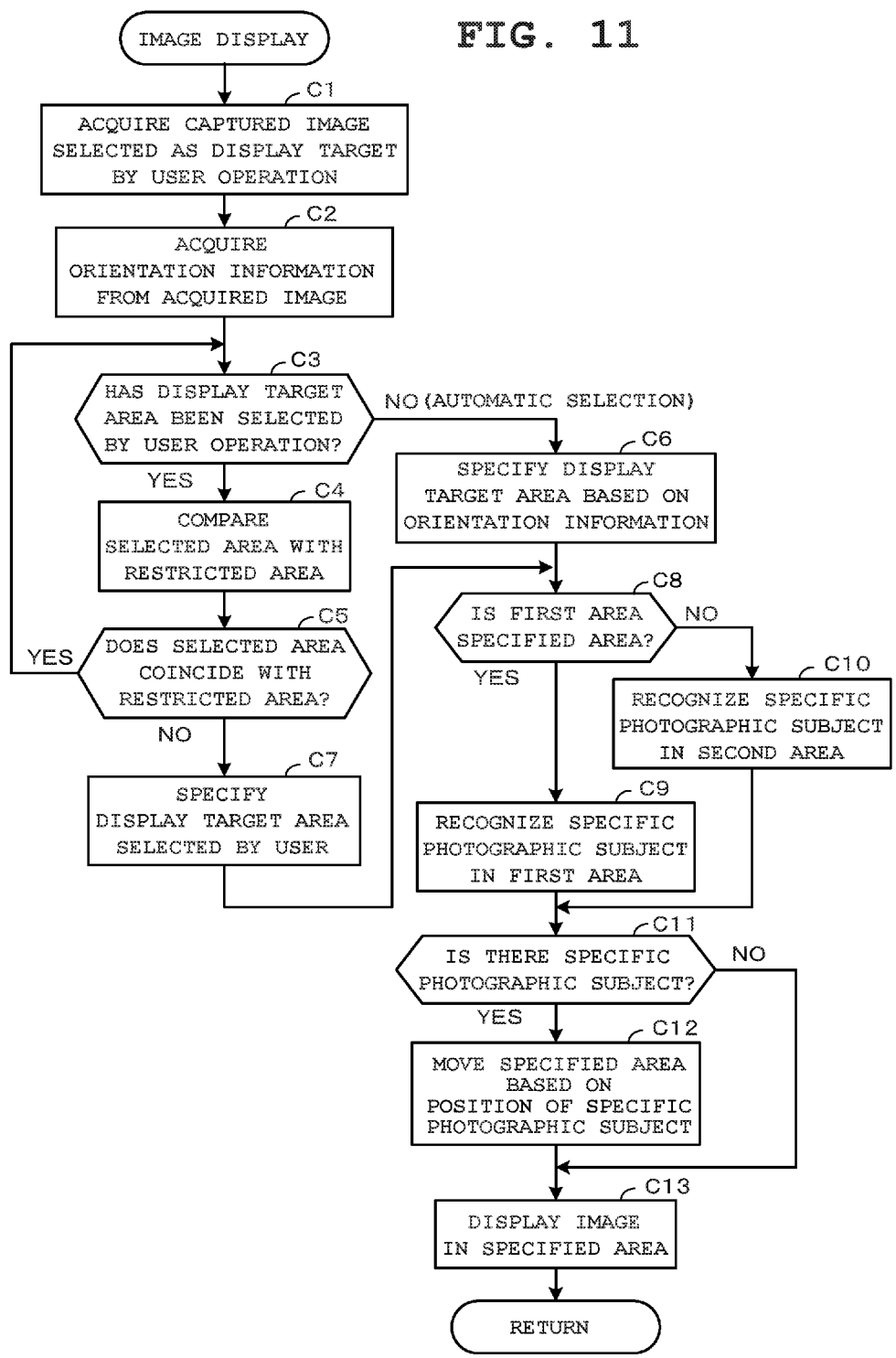

IMAGE PROCESSING APPARATUS, IMAGE PROCESSING METHOD AND STORAGE MEDIUM

CROSS-REFERENCE TO RELATED APPLICATION

This application is based upon and claims the benefit of priority from the prior Japanese Patent Application No. 2016-049151, filed Mar. 14, 2016, the entire contents of which are incorporated herein by reference.

BACKGROUND OF THE INVENTION

1. Field of the Invention

The present invention relates to an image processing apparatus for processing a captured image, an image processing method and a storage medium.

2. Description of the Related Art

In general, when image capturing by an imaging apparatus such as a digital camera is performed focusing more on an intended photographic subject than the background, the photographic subject is captured such that it is positioned at the center of a captured image. Also, when image capturing is performed focusing on both an intended photographic subject and the background, the photographic subject and the background are captured such that they are arranged with balance in an entire captured image. As such, image capturing is performed with composition in accordance with a purpose. Here, when acquiring a new image (an image that is acquired by a viewing angle being narrowed) showing a closeup view of an intended photographic subject from a captured image, the user is required to search for this intended captured image from among a number of stored images (captured images) and specify a portion thereof as a clipping area. If this clipping area is, for example, a rectangular area, the user specifies points on the screen corresponding to the four corners of the rectangular area, respectively, as disclosed in Japanese Patent Application Laid-Open (Kokai) Publication No. 2000-106623.

SUMMARY OF THE INVENTION

In accordance with one aspect of the present invention, there is provided an image processing apparatus comprising: a CPU which is operable to function as units comprising: a processing unit which (i) sets, as a first area, an area that is not a peripheral edge area in a captured image acquired by an imaging unit, (ii) sets an area including the peripheral edge area as a second area, and (iii) performs predetermined processing on one of the first area and the second area; and a specification unit which specifies whether the first area is subjected to the predetermined processing or the second area is subjected to the predetermined processing, based on orientation information of the imaging unit when the captured image is acquired.

In accordance with another aspect of the present invention, there is provided an image processing method for an image processing apparatus, comprising: setting, as a first area, an area that is not a peripheral edge area in a captured image acquired by an imaging unit; setting an area including the peripheral edge area as a second area; and performing predetermined processing on one of the first area and the second area, wherein whether the first area is subjected to the predetermined processing or the second area is subjected to the predetermined processing is specified based on orientation information of the imaging unit when the captured image is acquired.

In accordance with another aspect of the present invention, there is provided a non-transitory computer-readable storage medium having stored thereon a program that is executable by a computer in an image processing apparatus, the program being executable by the computer to actualize functions comprising: setting, as a first area, an area that is not a peripheral edge area in a captured image acquired by an imaging unit; setting an area including the peripheral edge area as a second area; and performing predetermined processing on one of the first area and the second area, wherein whether the first area is subjected to the predetermined processing or the second area is subjected to the predetermined processing is specified based on orientation information of the imaging unit when the captured image is acquired.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2A is a block diagram outlining the structure of the imaging device 10;

FIG. 2B is a block diagram outlining the structure of the main body device 20;

FIG. 4A to FIG. 4F are diagrams showing states where the housing of the imaging device 10 in the first orientation has been rotated around the optical axis to change its orientation, and examples of images captured when the housing is in these orientations;

FIG. 5 is a flowchart for describing an operation (a characteristic operation of the first embodiment) on the main body device 20 side which is started when a current mode is switched to an imaging mode;

FIG. 11 is a flowchart describing an operation (a characteristic operation of the second embodiment) of the PC 30 at the time of image display.

DETAILED DESCRIPTION OF THE PREFERRED EMBODIMENTS

Embodiments of the present invention will hereinafter be described with reference to the drawings.

(First Embodiment)

First, a first embodiment of the present invention is described with reference to FIG. 1 to FIG. 6.

Figure 1A:
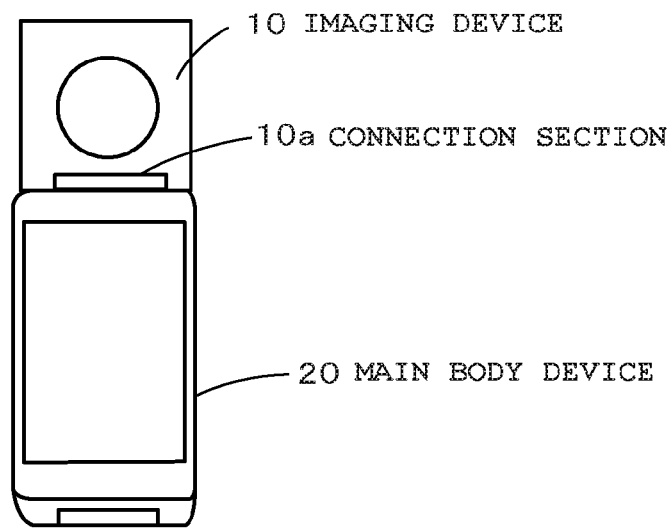
FIG. 1A is an external view of a digital camera where the present invention has been applied as an image processing apparatus, in which an imaging device 10 and a main body device 20 constituting the digital camera have been integrally combined.
Figure 1B:
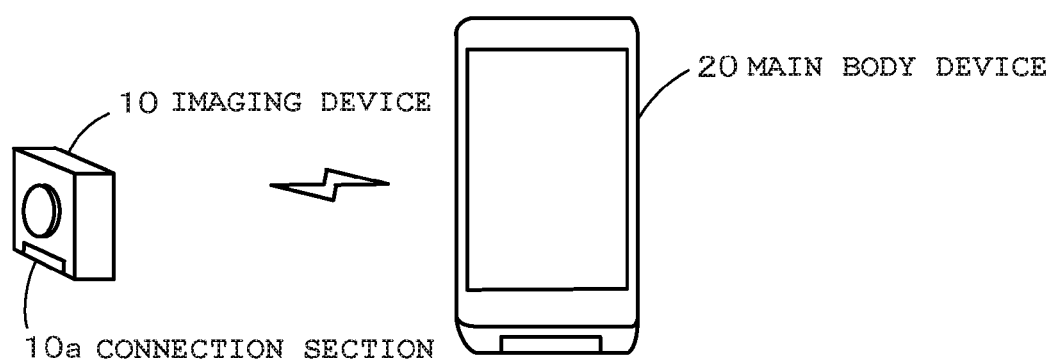
FIG. 1B is an external view showing a state where the imaging device 10 and the main body device 20 have been separated from each other.

The present embodiment is an example where the present invention has been applied in a digital camera as an image processing apparatus. This camera is a separate-type digital camera having an imaging device 10 including an imaging section described below and a main body device 20 including a display section described below, and the imaging device 10 and the main body device 20 are separable from each other. FIG. 1A is an external view of the image processing apparatus (digital camera), in which the imaging device 10 and the main body device 20 have been integrally combined. FIG. 1B is a diagram showing a state in which the imaging device 10 and the main body device 20 have been separated from each other. The housing of the imaging device 10 has a box shape as a whole. Note that reference numeral 10a indicates a connection section provided in one end portion of the imaging device 10 for connection to the main body device 20.

Between the imaging device 10 and the main body device 20 constituting the separate-type digital camera, pairing (wireless connection recognition) is possible by using wireless communication available for each device. As the wireless communication, wireless LAN (Wi-Fi) or Bluetooth (registered trademark) is used. The main body device 20 receives and acquires an image captured by the imaging device 10 and displays this captured image as a live view image. Note that the captured image in this embodiment refers to not only a stored image but also an image in a broad sense including an image that is being displayed on a live view screen (live view image: an image that has not been stored).

FIG. 2A is a block diagram showing the structure of the imaging device 10, and FIG. 2B is a block diagram showing the structure of the main body device 20.

The imaging device 10 in FIG. 2A is capable of capturing still images and moving images, and includes a control section 11, a power supply section 12, a storage section 13, a communication section 14, an operation section 15, an imaging section 16, and an orientation detection section 17. The control section 11 operates by power supply from the power supply section (secondary battery) 12, and controls the entire operation of the imaging device 10 in accordance with various programs in the storage section 13. In the control section 11, a CPU (Central Processing Unit), memories, and the like not shown are provided.

The storage section 13 is structured to have, for example, a ROM (Read Only Memory), flash memory, and the like, and has stored therein a program for achieving the present embodiment, various applications, and the like. Note that the storage section 13 may be structured to include a removable and transportable memory (recording medium) such as an SD (Secure Digital) card or a USB (Universal Serial Bus) memory, and may partially include an area of a predetermined external server not shown in the drawing. The communication section 14 transmits a captured image to the main body device 20, and receives an operation instruction signal and the like from the main body device 20. The operation section 15 includes a basic operation key (hardware key) such as a power supply switch.

The imaging section 16 constitutes a camera section capable of capturing a photographic subject with high definition. This imaging section 16 has a lens unit 16A, which is provided with a fisheye lens 16B, an image sensor 16C, and the like. In the camera of the present embodiment, a normal imaging lens (omitted in the drawing) and the fisheye lens 16B are interchangeable. In the shown example, the fisheye lens 16B has been attached. This fisheye lens 16B is, for example, a circumferential fisheye lens formed of a lens system constituted by three lenses and capable of wide range imaging with a viewing angle of substantially 180 degrees (full-circular fisheye lens). A wide-angle image (fisheye image) captured by this fisheye lens 16B is a circular image as a whole. In this embodiment, a projective method has been adopted, and therefore a wide-angle image (fisheye image) captured by the fisheye lens 16B is significantly distorted from its center toward its end.

That is, since the fisheye lens 16B is a circumferential fisheye lens capable of wide range imaging with a viewing angle of substantially 180 degrees, a fisheye image captured thereby is a circular image as a whole, in which distortion is significantly increased from its center toward its end (peripheral portion) and this peripheral portion has a reduced size as compared to the center portion. Accordingly, when viewing and checking the detail of the peripheral portion, the user has a hard time checking it. When a subject image (optical image) from the fisheye lens 16B is formed at the image sensor (for example, CMOS (Complementary Metal Oxide Semiconductor) or CCD (Charge-Coupled Device)) 16C, an image signal (analog-value signal) acquired by optical/electrical conversion by the image sensor 16C is converted into a digital signal (image signal) by an A/D converting section omitted in the drawing, subjected to predetermined image display processing, and then transmitted to the main body device 20 for monitor display.

The orientation detection section 17 is constituted by a triaxial acceleration sensor for detecting acceleration applied to the imaging device 10 and the like, and provides the control section 11 with acceleration components in X, Y, and Z directions detected in accordance with the orientation of the imaging device 10. Note that, as described above, the housing of the imaging device 10 has a box shape as a whole. Its short side direction is the X-axis direction, its long side direction is the Y-axis direction, and its thickness direction is the Z-axis direction. The control section 11 detects the orientation (a first orientation and a second orientation described later) of the imaging device 10 by comparing acceleration components of the X axis, the Y axis, and the Z axis, and transmits this orientation information to the main body device 20 from the communication section 14.

In FIG. 2B, the main body device 20, which constitutes the controller of the digital camera, has a replay function for displaying an image captured by the imaging device 10, and includes a control section 21, a power supply section 22, a storage section 23, a communication section 24, an operation section 25, and a touch display section 26. The control section 21 operates by power supply from the power supply section (secondary battery) 22 and controls the entire operation of the main body device 20 in accordance with various programs in the storage section 23. In the control section 21, a CPU (Central Processing Unit), memories, and the like not depicted are provided. The storage section 23 is structured to have, for example, a ROM, flash memory, and the like, and includes a program memory 23A having stored therein a program for achieving the present embodiment, various applications, and the like, and a work memory 23B for temporarily storing various information (for example, a flag) required for the main body device 20 to operate.

The communication section 24 transmits and receives various data to and from the imaging device 10. The operation section 25 includes various push-button keys, such as a power supply button, a release button, and setting buttons for setting imaging conditions such as exposure and shutter speed. The control section 21 performs processing in accordance with an input operation signal from the operation section 25, and transmits an input operation signal to the imaging device 10. The touch display section 26 is structured to have a touch panel 26B arranged and laminated on a display 26A such as a high-definition liquid-crystal display. The display screen of the touch display section 26 serves as a monitor screen (live view screen) for displaying a live view image (fisheye image) in real time, or a replay screen for replaying a captured image.

The control section 21 on the main body device 20 side displays a captured image (fisheye image) received from the imaging device 10 on a live view screen, specifies a processing target area to be subjected to predetermined processing based on orientation information received from the imaging device 10, and displays a frame (rectangular frame) for indicating the specified processing target area on the live view screen. That is, in the case of a configuration where an area that is not the peripheral edge area of a captured image (an area excluding the edge area) is set as a first area and an area including the edge area is set as a second area, one of the first and second areas is specified based on information regarding the orientation of the imaging device 10, and a rectangular frame for indicating the range of this area is displayed on a live view screen.

In the present embodiment, the above-described second area refers to the entire area of a captured image (the entire area within the viewing angle) including its peripheral edge. Also, in the present embodiment, the above-described predetermined processing refers to trimming processing for clipping a partial image from a fisheye image, distortion correction processing for correcting distortion of a fisheye image, and image storage processing. Note that, although details will be described later, this predetermined processing (such as trimming processing) is performed in accordance with the type of a processing target area (whether it is the first area or the second area).

FIG. 3 and FIG. 4 are diagrams exemplarily showing various orientations of the imaging device 10 and images captured when the imaging device 10 is in these orientations.

Figure 3A:
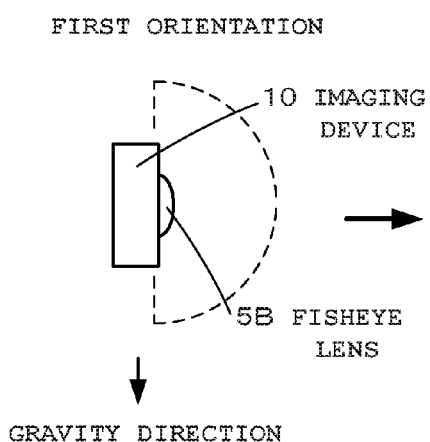
FIG. 3A is a diagram showing a state where the imaging device 10 is in a first orientation.
Figure 3B:
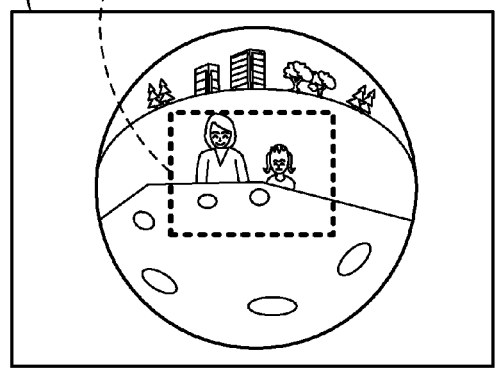
FIG. 3B is a diagram showing a fisheye image captured by a fisheye lens when the imaging device 10 is in the first orientation.

FIG. 3A is a diagram showing a case in which the imaging device 10 performing image capturing is in the first orientation where an angle formed between the optical axis direction of the fisheye lens 16B arranged at the center of the front portion of the imaging device 10 and the gravity direction is within an allowable angle range with reference to a right angle. Note that a hemisphere depicted by a dashed line in the drawing indicates the imaging range of the fisheye lens 16B whose viewing angle is substantially 180 degrees (the same applies hereinafter). FIG. 3B is a diagram showing a display example of a live view image (fisheye image) captured with persons being positioned at the center and the imaging device 10 being in the first orientation. On this live view screen, a rectangular frame (indicated by a dashed line in the drawing) for indicating a processing target area (first area) to be subjected to predetermined processing is displayed and superimposed.

The rectangular frame on the first area in FIG. 3B, which targets a portion of a captured image as a processing target range, indicates a clipping range for clipping an image within this range from the captured image. The control section 21 on the main body device 20 side clips the image within the processing target area (the rectangular frame on the first area) from the captured image and then performs processing for correcting distortion in the clipped image (fisheye image). In this embodiment, a technique is used in which a plane that is, at an arbitrary point, in contact with a virtual spherical surface model is taken as a screen, and coordinate transformation of the contact point on the virtual spherical surface model to the contact point on the screen is performed, whereby distortion in a fisheye image is corrected. Note that this processing (fisheye distortion correction processing) for correcting distortion in a fisheye image is a well-known technique that is commonly used in image processing, and therefore its details are omitted. Then, the control section 21 performs development processing on the corrected image, performs image compression processing so as to convert it to a file format, and then records and stores it in a recording medium in the storage section 23.

Figure 3C:
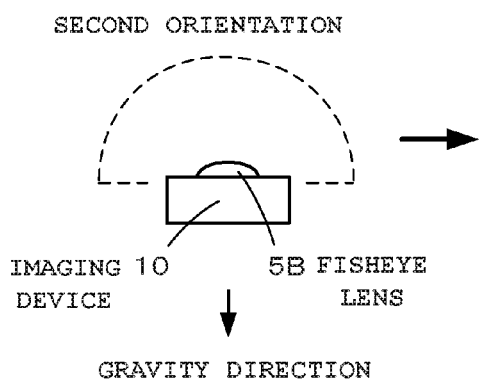
FIG. 3C is a diagram showing a state where the imaging device 10 is in a second orientation.
Figure 3D:
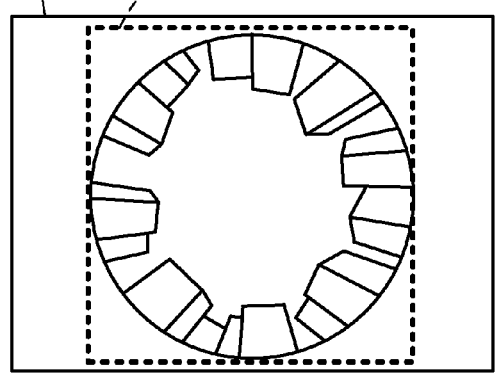
FIG. 3D is a diagram showing a fisheye image captured by the fisheye lens when the imaging device 10 is in the second orientation.

FIG. 3C is a diagram showing a case in which the imaging device 10 performing image capturing is in the second orientation where the optical axis direction of the fisheye lens 16B of the imaging device 10 is parallel to the gravity direction, or an angle formed between the optical axis direction and the gravity direction is within an allowable angle range with reference to 180 degrees. FIG. 3D is a diagram showing a display example of a live view image (fisheye image) acquired by a group of buildings being captured with the imaging device 10 in the first orientation. On this live view screen, a rectangular frame for indicating a processing target area (second area) to be subjected to predetermined processing is displayed and superimposed. This rectangular frame on the second area in FIG. 3D indicates that the entire area (entire viewing angle) of an image is a processing target range. In this case, the control section 21 performs development processing on the entire area of a captured image, performs image compression processing so as to convert it to a file format, and then records and stores it in the recording medium in the storage section 23.

FIG. 4A to FIG. 4F are diagrams showing states where the housing of the imaging device 10 in the first orientation has been rotated around the optical axis to change its orientation, and examples of images captured when the housing is in these orientations. FIG. 4A shows the same orientation (first orientation) as FIG. 3A, and FIG. 4B shows the same live view screen as FIG. 3B. FIG. 4C shows the orientation (orientation 1-2) of the housing when the housing in a normal orientation (orientation 1-1: upright) where the connection section 10a is in the gravity direction is rotated in the clockwise direction (the right direction in the drawing) by 90 degrees, and FIG. 4D is a diagram showing an example of a live view screen after the housing is rotated by 90 degrees so as to be in this orientation. In this case, the imaging device 10 is in the first orientation. However, unlike the case of FIG. 4B where only the center of a captured image is taken as a processing target area, the entire area (entire viewing angle) of a captured image is taken as a processing target area. For this reason, the rectangular frame for the second area is displayed and superimposed on the live view screen. Accordingly, the control section 21 performs development processing on the entire area of a captured image, performs image compression processing so as to convert it to a file format, and records and stores it in the recording medium in the storage section 23.

FIG. 4E shows the orientation 1-3) of the housing when the housing in the above-described normal orientation (orientation 1-1) is rotated in the counterclockwise direction (the left direction in the drawing) by 90 degrees, and FIG. 4F is a diagram showing a live view screen after the housing is rotated by 90 degrees so as to be in this orientation. On this live view screen, the rectangular frame for indicating the first area is displayed and superimposed. However, this rectangular frame for the first area in FIG. 4F is a rectangular frame of a panorama size having an aspect ratio of 8:3, while the rectangular frame for the first area in FIG. 3B is a rectangular frame of a standard size having an aspect ratio of 4:3. The control section 21 clips an image (panorama-size image) in the processing target area from a captured image, and performs processing for correcting distortion in the clipped image (fisheye image). Then, the control section 21 performs development processing on the corrected image, performs image compression processing so as to convert it to a file format, and records and stores it in the recording medium in the storage section 23.

Figure 6:
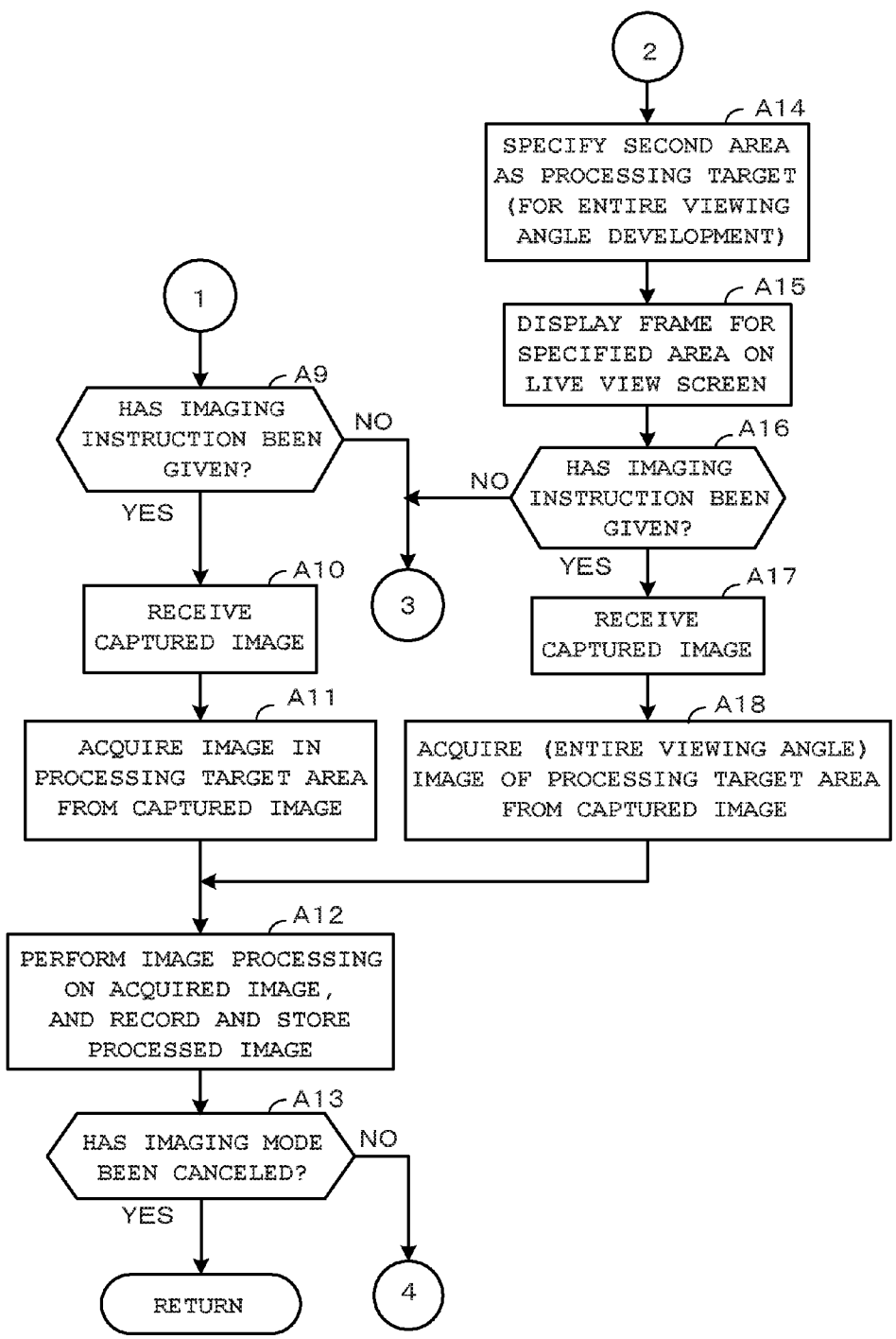
FIG. 6 is a flowchart of an operation following the operation of FIG. 5.

Next, the operation concept of the image processing apparatus (digital camera) in the first embodiment is described with reference to flowcharts shown in FIG. 5 and FIG. 6. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later. FIG. 5 and FIG. 6 are flowcharts outlining the operation of the characteristic portion of the first embodiment from among all of the operations of the main body device 20. After exiting the flows of FIG. 5 and FIG. 6, the control section 21 returns to the main flow (omitted in the drawing) of the overall operation.

The flowcharts in FIG. 5 and FIG. 6 are to describe the operation (the characteristic operation of the first embodiment) of the main body device 20 which is started when a current mode is switched to an imaging mode.

First, the control section 21 of the main body device 20 starts an operation of controlling the touch display section 26 to display an image acquired from the imaging device 10 as a live view image (Step A1 of FIG. 5). In addition, the control section 21 acquires orientation information from the orientation detection section 17 of the imaging device 10 (Step A2), and thereby judges whether the imaging device 10 is in the first orientation or in the second orientation (Step A3).

When judged that the imaging device 10 is in the first orientation as shown in FIG. 3A (Step A3), the control section 21 further judges the rotation status of the housing of the imaging device 10 (camera housing) based on the orientation information (Step A4). That is, the control section 21 judges the orientation of the camera housing after it is rotated with the imaging device 10 being in the first orientation. When judged that the camera housing is in the normal orientation (orientation 1-1), the control section 21 proceeds to Step A6, and specifies the first area (the center area) for standard size (width 4: height 3) development as a processing target area for a photographic image. Also, when judged that the camera housing is in the orientation (orientation 1-2) achieved by the camera housing in the normal orientation being rotated in the clockwise direction by 90 degrees as shown in FIG. 4C, the control section 21 proceeds to Step A7, and specifies the second area for entire viewing angle development so as to set the entire area (entire viewing angle) of a photographic image as a processing target area.

Also, when judged that the camera housing is in the orientation (orientation 1-3) achieved by the camera housing in the normal orientation being rotated in the counterclockwise direction by 90 degrees as shown in FIG. 4E, the control section 21 proceeds to Step A5, and specifies the first area (the center area and a portion of the peripheral area) for panorama size (width 8:height 3) development as a processing target area for a photographic image. As such, when the imaging device 10 is in the first orientation, the specifying of the first area or the second area as a processing target area based on the rotation status of the camera housing is further performed. Then, the control section 21 causes a rectangular frame for indicating the specified area to be displayed and superimposed on the live view screen, as shown in FIG. 4B, FIG. 4D, FIG. 4F (Step A8).

Then, the control section 21 proceeds to Step A9 of FIG. 6, and judges whether an operation (a release key operation) for instructing to perform image capturing has been performed (Step A9). When judged that no imaging instruction operation has been performed (NO at Step A9), the control section 21 returns to Step A2 of FIG. 5. Hereafter, until an imaging instruction operation is performed, the control section 21 performs the processing for specifying a processing target area based on orientation while acquiring orientation information. Then, when an imaging instruction operation is performed (YES at Step A9), the control section 21 receives an image (fisheye image) captured at the timing of the imaging instruction operation from the imaging device 10 (Step A10), and acquires an image in the processing target area (an image in the first area or the second area) from this fisheye image (Step A11).

That is, when the first area has been specified as in Step A5 or Step A6 of FIG. 5, the control section 21 performs processing for acquiring (clipping) an image in the first area from the fisheye image. For example, in the case of Step A6, an image for standard size development is clipped as the image in the first area. In the case of Step A5, an image for panorama size development is clipped as the image in the first area. Also, when the second area has been specified as in Step A7 of FIG. 5, the control section 21 does not perform the image clipping processing but acquires the entire fisheye image (entire viewing angle) as a processing target.

Then, the control section 21 performs distortion correction processing on the acquired image, performs development processing and image compression processing so as to convert it to a file format, and records and stores it in the recording medium in the storage section 23 (Step A12). Next, the control section 21 judges whether the imaging mode has been canceled (Step A13). When judged that the current mode is still the imaging mode (NO at Step A13), the control section 21 returns to Step A1 of FIG. 5 and repeats the above-described operations. When the imaging mode is canceled (YES at Step A13), the control section 21 exits the flows of FIG. 5 and FIG. 6.

At Step A3, when judged that the imaging device 10 is in the second orientation as shown in FIG. 3C (Step A3 of FIG. 5), the control section 21 proceeds to Step A14 of FIG. 6, and specifies the second area for entire viewing angle development so as to set the entire area (entire viewing angle) of a photographic image as a processing target area. Then, the control section 21 causes the rectangular frame for indicating the second area to be displayed and superimposed on the live view screen (Step A15), and judges whether an operation (a release key operation) for instructing to perform image capturing has been performed (Step A16). When judged that no imaging instruction operation has been performed (NO at Step A16), the control section 21 returns to Step A2 of FIG. 5. Hereafter, until an imaging instruction operation is performed, the control section 21 performs the processing for specifying a processing target area based on orientation while acquiring orientation information.

Then, when an imaging instruction operation is performed (YES at Step A16), the control section 21 receives an image (fisheye image) captured at the timing of the imaging instruction operation from the imaging device 10 (Step A17), and acquires an entire viewing angle image from the fisheye image as an image in the processing target area (Step A18). Then, the control section 21 performs, on the acquired image, distortion correction processing, development processing, and image compression processing for conversion to a file format, and records and stores it in the recording medium in the storage section 23 (Step A12). Next, the control section 21 judges whether the imaging mode has been canceled (Step A13). Hereafter, until the imaging mode is canceled, the control section 21 keeps returning to Step A1 of FIG. 5 and repeats the above-described operations.

As described above, the digital camera of the first embodiment includes the imaging device 10 and the main body device 20. The main body device 20 takes, as the first area, an area that is not the peripheral edge area of an image acquired from the imaging device 10, and takes an area including the edge area as the second area. When performing predetermined processing on one of the first area and the second area, the main body device 20 specifies whether the first area is subjected to the predetermined processing or the second area is subjected to the predetermined processing based on the orientation of the imaging device 10. As a result of this configuration, an area to be subjected to suitable processing can be easily and appropriately specified without complicated operations by a user. That is, by performing image capturing with a camera being in a natural orientation suitable for an intended composition, the user can easily and appropriately specify an area to be processed without performing complicated operations in the image capturing.

Also, the main body device 20 specifies one of the first and second areas as a processing target based on orientation information detected by the orientation detection section 17 of the imaging device 10. As a result of this configuration, a processing target area can be precisely specified based on an accurately detected orientation.

Moreover, the main body device 20 specifies the first area as a processing target when an angle formed between the optical axis direction of the imaging device 10 and the gravity direction is within an allowable angle range with reference to a right angle (when the imaging device 10 is in the first orientation). As a result of this configuration, when performing image capturing while focusing more on an intended photographic subject than the background, the user is only required to set the imaging device 10 in the first orientation such that the photographic subject is positioned at the center of the viewing angle, whereby the first area which is suitable for capturing the photographic subject can be set as a processing target.

Furthermore, when the imaging device 10 is in the first orientation, the main body device 20 specifies, as a processing target, the first area having different shapes for each rotation state of the housing of the imaging device 10. As a result of this configuration, even when the imaging device 10 is in the same first orientation, the user can set a first area having a different shape, such as a standard size area or a panorama size area, as a processing target by merely rotating the housing to change its orientation.

Still further, when the imaging device 10 is in the first orientation, depending on the rotation status of the housing of the imaging device 10, the main body device 20 specifies the second area as a processing target. As a result of this configuration, even when the imaging device 10 is in the same first orientation, the user can set the first area or the second area as a processing target by merely rotating the housing to change its orientation.

Yet still further, when an angle formed between the optical axis direction of the imaging device 10 and the gravity direction is within an allowable angle range with reference to 180 degrees (when the imaging device 10 is in the second orientation), the second area is specified as a processing target. As a result of this configuration, when performing wide range imaging, the user is only required to set the imaging device 10 in the second orientation, whereby the second area which is suitable for the wide range imaging can be set as a processing target.

Yet still further, the main body device 20 displays an image acquired from the imaging device 10 as a live view image, acquires a result of detection (orientation information) by the orientation detection section 17 from the imaging device 10, judges the orientation of the imaging device 10, and displays the frame indicating the first area or the second area specified in accordance with the orientation. As a result of this configuration, the user can easily identify the specified area.

Yet still further, when the first area is specified as a processing target, the main body device 20 performs the processing for clipping an image in the first area from a captured image and recording it. When the second area is specified as a processing target, the main body device 20 performs the processing for recording and storing an entire captured image. As a result of this configuration, whether to recode and store an entire captured image or to record a portion thereof can be easily and appropriately controlled based on the orientation of the imaging device 10.

Yet still further, as a result of the configuration where the main body device 20 performs the processing for clipping an image in the first area from a captured image when the first area is specified as a processing target, when image capturing is performed in which an intended photographic subject is positioned at the center so that it is more focused than the background, an area showing the photographic subject can be clipped.

Yet still further, the main body device 20 acquires an image captured by the fisheye lens 16B, and performs processing for correcting distortion in an image in an area specified as a processing target. As a result of this configuration, even distortion in an image captured by the fisheye lens 16B can be corrected.

Yet still further, the main body device 20 performs panorama development for an image in a specified area. As a result of this configuration, panorama images can be acquired in accordance with the orientation of the imaging device 10.

(Modification Example 1)

In the above-described first embodiment, the main body device 20 records and stores an image in an area specified as a processing target in a captured image based on the orientation of the imaging device 10. However, a configuration may be adopted in which an image in an area specified as a processing target is displayed on or transmitted to another external device such as an external display device via communication means. As a result of this configuration, the user can easily confirm an image in a processing target area by display.

Also, in the above-described first embodiment, the present invention has been applied in a separate type digital camera where the imaging device 10 and the main body device 20 are separable. However, the present invention may be applied in a digital compact camera where these devices have been integrally provided.

Moreover, in the above-described first embodiment, the case has been described in which a still image is captured. However, the present invention can be applied in a case where a moving image is captured. In this case, when the first area is specified as a processing target area, an area having an aspect ratio of, for example, 16 (width):9 (height) may be clipped as a normal size of the moving image.

(Second Embodiment)

Hereafter, a second embodiment of the present invention is described with reference to FIG. 7A to FIG. 11.

In the above-described first embodiment, the present invention has been applied in a separate type digital camera where the imaging device 10 and the main body device 20 are separable, in which the main body device 20 during image capturing records and stores an image in an area specified as a processing target in a captured image based on the orientation of the imaging device 10. In the second embodiment, the present invention has been applied in a notebook PC (Personal Computer) 30 as an image processing apparatus. When acquiring and displaying an image (stored image) captured by an imaging apparatus (digital camera) 40, this PC displays an image in an area (the first area or the second area) specified as a processing target (display target) in the captured image based on the orientation of the camera at the time of the image capturing. Note that, as in the first embodiment, the first area herein is an area that is not the edge area of an image and the second area herein is an area including the edge area.

Figure 7A:
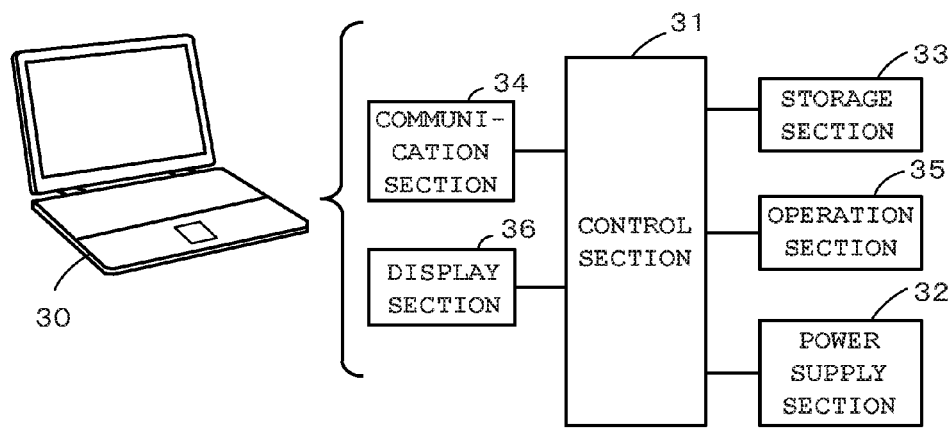
FIG. 7A is a block diagram outlining the structure of an image processing apparatus (personal computer: PC) 30 of a second embodiment.
Figure 7B:
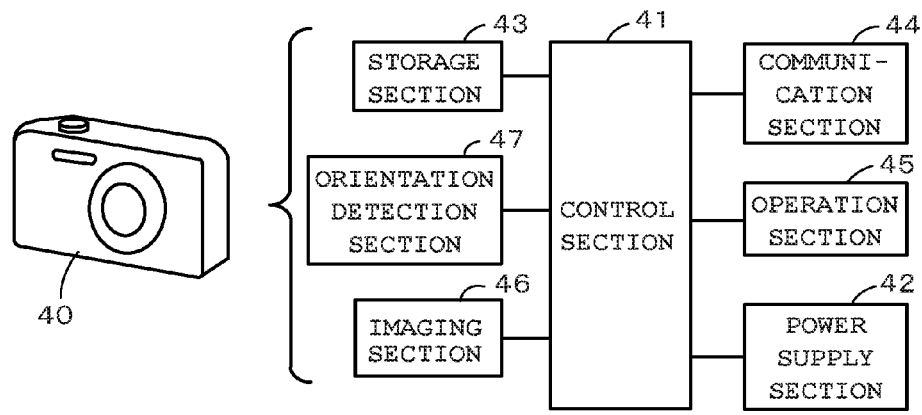
FIG. 7B is a block diagram outlining the structure of an imaging apparatus (digital camera) 40 of the second embodiment.

FIG. 7A and FIG. 7B are block diagrams showing the structures of the image processing apparatus (PC) 30 and the imaging apparatus (digital camera) 40.

The PC 30 and the camera 40 have structures that are basically the same as those of the main body device 20 and the imaging device 10 shown in the first embodiment, and therefore their details are omitted. FIG. 7A shows the structure of the PC 30, which includes a control section 31, a power supply section 32, a storage section 33, a communication section 34, an operation section 35, and a display section 36. FIG. 7B shows the structure of the camera 40, which includes a control section 41, a power supply section 42, a storage section 43, a communication section 44, an operation section 45, an imaging section 46 having a fisheye lens, and an orientation detection section 47.

Figure 8A:
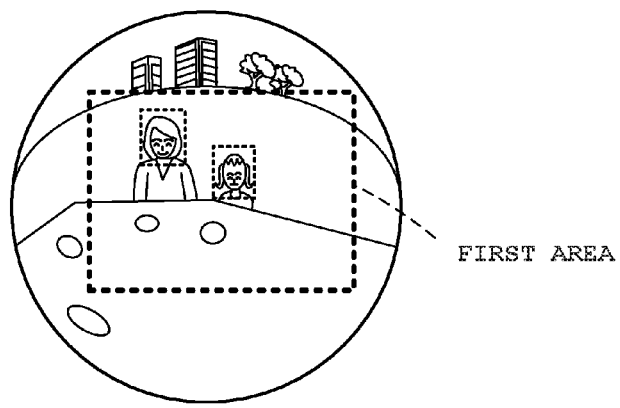
FIG. 8A is a diagram showing a fisheye image captured when the imaging apparatus 40 is in the first orientation in the second embodiment.
Figure 8B:
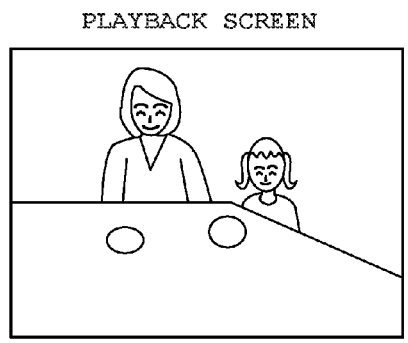
FIG. 8B is a diagram showing an example of an image acquired by distortion correction being performed on an image clipped for standard size development from a first area in the fisheye image in the second embodiment.

FIG. 8A is a diagram showing an image (stored image: fisheye image) captured with persons being positioned at the center of the viewing angle when the camera 40 is in a first orientation where an angle formed between the front direction of the camera 40 (the optical axis direction of its fisheye lens) and the gravity direction is within an allowable angle range with reference to a right angle. The rectangle depicted with a thick dashed line in the drawing indicates an area specified on the stored image in accordance with the first orientation, that is, the first area specified as a processing target area (display area) to be subjected to predetermined processing (display processing). Also, the rectangles depicted with thin dashed lines and arranged around the faces of the persons in the first area indicate the persons' faces as specific photographic subjects. The PC 30 recognizes these specific photographic subjects in the first area, and moves the arrangement position of the first area on the stored image such that they are arranged at the center of the first area. FIG. 8B shows a playback screen on the PC 30 side, on which an image clipped from the first area in the fisheye image in FIG. 8A and subjected to distortion correction is being displayed.

Figure 9A:
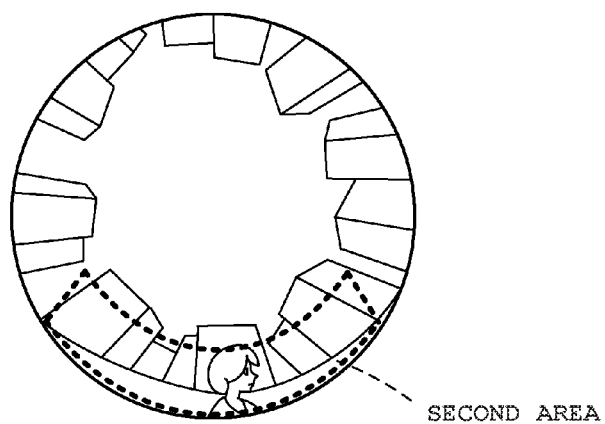
FIG. 9A is a diagram showing a fisheye image captured when the imaging apparatus 40 is in the second orientation in the second embodiment.
Figure 9B:
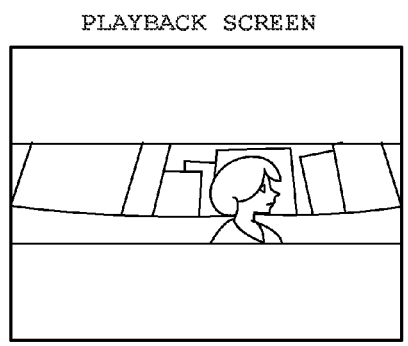
FIG. 9B is a diagram showing an example of an image acquired by distortion correction being performed on an image clipped for panorama size development from a second area in the fisheye image in the second embodiment.

FIG. 9A is a diagram showing a captured image (stored image: fisheye image) acquired by buildings including a person nearby being photographed when the camera 40 is in a second orientation where an angle formed between the front direction of the camera 40 (the optical axis direction of its fisheye lens) and the gravity direction is within an allowable angle range with reference to 180 degrees. The rectangle depicted with a dashed line in the drawing indicates an area specified on the stored image in accordance with the second orientation, that is, the second area specified as a processing target area (display area) to be subjected to predetermined processing (display processing). In the case of the first embodiment, this second area is an area including the peripheral area of a fisheye image (the entire viewing angle of the fisheye image). However, in the second embodiment, it is a partial peripheral area (arc-like area) of a fisheye image. FIG. 9B shows a playback screen on the PC 30 side, on which a panorama image clipped from the second area in the fisheye image in FIG. 9A and subjected to distortion correction is being displayed.

Figure 10:
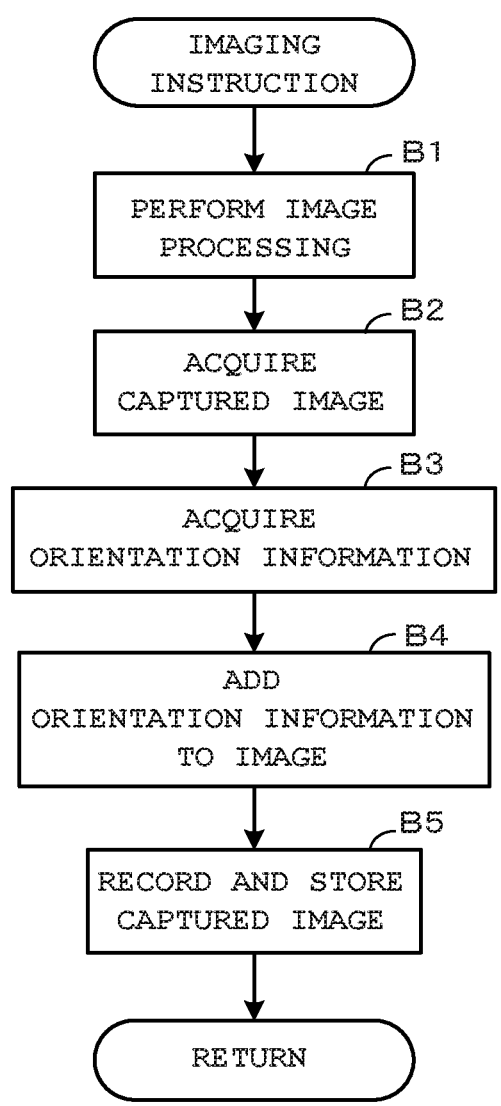
FIG. 10 is a flowchart describing an operation (a characteristic operation of the second embodiment) of the camera 40 which is started in response to an imaging instruction operation.

FIG. 10 is a flowchart showing an operation (a characteristic operation of the second embodiment) of the camera 40 which is started in response to an imaging instruction operation.

First, the control section 41 of the camera 40 performs, on an image captured by the imaging section 46, development processing and image compression processing for conversion to a file format (Step B1), and acquires the processed image (Step B2). Then, the control section 41 acquires the orientation of the camera 40 at the time of the image capturing from the orientation detection section 47 (Step B3), adds this orientation information to the captured image as EXIF (Exchangeable Image File Format) information (Step B4), and causes this captured image attached with the EXIF information to be recorded and stored in a recording medium of the storage section 23 (Step B5).

FIG. 11 is a flowchart showing an operation (a characteristic operation of the second embodiment) of the PC 30 during image playback.

First, in a state where images (fisheye images) captured by the camera 40 have been loaded via communication means or a recording medium (such as a SD card, a USB memory, and the like), the control section 31 of the PC 30 acquires, from the loaded images, a fisheye image selected as a display target by a user operation (Step C1). In addition, the control section 31 acquires orientation information added to the acquired fisheye image as EXIF information (Step C2).

Then, before performing processing for specifying a display target area (the first area or the second area) in the fisheye image based on the orientation information, the control section 31 judges whether a display target area has been selected by a user operation (Step C3). That is, in the second embodiment, an area selected by a user operation can be specified as a display target area instead of an area automatically selected based on orientation information, as in the case of the first embodiment. When judged that no display target area has been selected by a user operation (NO at Step C3), the control section 31 judges whether the camera 40 is in the first orientation or in the second orientation based on the orientation information (Step C6), as in the first embodiment. When the camera 40 is in the first orientation, the control section 31 automatically specifies the first area as a processing target area (display target area). When the camera 40 is in the second orientation, the control section 31 automatically specifies the second area as a processing target area (display target area).

At Step C3, when a processing target area (display target area) has been arbitrarily selected by a user operation (YES at Step C3), the control section 31 compares this area selected by the user with a restricted area set in advance (Step C4). The restricted area herein is an area set in advance so as to restrict an area to be selected by a user operation when it is not suitable for the orientation of the camera 40. For example, in FIG. 4F, an area for panorama development has been set as a processing target area corresponding to the first orientation. In panorama development, no problem occurs when a photographic subject is at the center of a fisheye image. However, in a case where the photographic subject is at the edge area thereof, this subject is distorted. Accordingly, when the camera 40 is in the first orientation for panorama development, the edge of an image is set as a restricted area.

Then, based on the result of the comparison of the area selected by the user and the restricted area, the control section 31 judges whether the area selected by the user and the restricted area coincide with each other (Step C5). When the area selected by the user and the restricted area coincide with each other (YES at Step C5), the control section 31 returns to the above-described Step C3 so as to cancel this selection. Conversely, when the area selected by the user and the restricted area do not coincide with each other (NO at Step C5), the control section 31 specifies this first area or second area selected by the user as a display target area (Step C7). Next, the control section 31 judges whether the first area is the specified area (Step C8). When the first area is the specified area (YES at Step C8), the control section 31 analyzes this first area and recognizes whether a specific photographic subject set in advance corresponding to the first area, such as a person's face, food, and the like, is shown therein (Step C9). Similarly, When the second area is the specified area (NO at Step C8), the control section 31 analyzes the second area and recognizes whether a specific photographic subject set in advance corresponding to the second area, such as a person's face, is shown therein (Step C10).

As a result, when no specific subject is in the first or second area (NO at Step C11), the control section 31 proceeds to processing for displaying an image in the specified area (Step C13). When there is a specific photographic subject (YES at Step C11), the control section 31 detects the position of the specific photographic subject on the fisheye image, and performs position adjustment processing for moving the center of the first or second area to the detected position (Step C12). Then, the control section 31 proceeds to image display processing (Step C13). At Step C13, an image in the first or second area is processed and displayed on the display section 36. For example, when the first area has been specified, an image (an image of a standard size) in the first area is clipped from the fisheye image as shown in FIG. 8B, subjected to distortion correction, and enlarged to be displayed. Also, when the second area has been specified, an image (an image of a panorama size) in the second area is clipped from the fisheye image as shown in FIG. 9B, subjected to distortion correction, and enlarged to be displayed.

As described above, in the second embodiment, the image processing apparatus (PC) 30 acquires a captured image where information indicating the orientation of the imaging apparatus (camera) 40 at the time of the image capturing has been added. Then, when performing predetermined processing on this captured image, the PC 30 specifies whether the first area is a target for the predetermined processing or the second area is a target for the predetermined processing based on the orientation information. As a result of this configuration, the user can easily and appropriately specify an area to be subjected to suitable processing without complicated operations.

Also, when the imaging apparatus 40 is in the orientation (first orientation) where an angle formed between its optical axis direction and the gravity direction is within an allowable angle range with reference to a right angle, the PC 30 specifies the first area as a target for predetermined processing. As a result of this configuration, when performing image capturing while focusing more on an intended photographic subject than the background, the user is only required to set the imaging apparatus 40 to be in the first orientation such that the photographic subject is positioned at the center of the viewing angle, whereby the first area suitable for capturing the photographic subject is set as a processing target.

Moreover, when the imaging apparatus 40 is in the orientation (second orientation) where an angle formed between its optical axis direction and the gravity direction is within an allowable angle range with reference to 180 degrees, the PC 30 specifies the second area as a target for predetermined processing. As a result of this configuration, when performing wide range imaging, the user is only required to set the imaging apparatus 40 to be in the second orientation, whereby the second area suitable for the wide range imaging is set as a processing target.

Furthermore, when the first area is specified as a processing target area, the PC 30 performs the processing of clipping an image in the first area from a captured image. As a result of this configuration, when image capturing is performed in which an intended photographic subject is positioned at the center of the viewing angle so as to be more focused than the background, an area showing the photographic subject can be clipped.

Still further, the PC 30 acquires an image captured by the fisheye lens 16B, and performs the processing of correcting distortion in an image in an area specified as a processing target. As a result of this configuration, distortion in an image captured by the fisheye lens 16B can be corrected.

Yet still further, the PC 30 performs panorama development for an image in a specified area. As a result of this configuration, panorama images can be acquired in accordance with the orientation of the imaging device 10.

Yet still further, when a processing target area is selected by a user operation, the PC 30 specifies, on condition that the selected area is not unsuitable with respect to the orientation of the camera, the selected area as a processing target in this orientation. As a result of this configuration, an area unsuitable with respect to the orientation of the camera can be eliminated when an area selected by a user operation is specified as a processing target, whereby only an area that is suitable with respect to the orientation of the camera can be can be specified.

Yet still further, the PC 30 recognizes the position of a specific photographic subject included in an area specified as a processing target, and moves the area in accordance with the position of the photographic subject. As a result of this configuration, by a person's face or the like being set in advance as a specific photographic subject, an image focusing on the person's face or the like can be easily acquired.

(Modification Example 2)

In the above-described second embodiment, the PC 30 displays an image in an area specified as a processing target in a captured image based on the orientation of the camera. However, a configuration may be adopted in which an image in an area specified as a processing target is transmitted to another external device (such as an external display device) via communication means.

Also, in the above-described second embodiment, the position of a specified area is adjusted in accordance with the position of a specific photographic subject. However, this position adjustment processing (Step C8 to Step C12 in FIG. 11) may be omitted.

(Modification Example 3)

In the above-described second embodiment, when a processing target area is selected by a user operation, this selected area is, on condition that it is not unsuitable with respect to the orientation of the camera, specified as a processing target in this orientation. This configuration may be similarly adopted in the first embodiment.

(Modification Example 4)

In the above-described second embodiment, the position of a specific photographic subject included in an area specified as a processing target is recognized, and this area is moved in accordance with the position of the photographic subject. This configuration may be similarly adopted in the first embodiment.

In each of the above-described embodiments, one of the first and second areas is specified as a processing target in accordance with the orientation (the first orientation or the second orientation) of the camera. However, the present invention is not limited to these two types of orientations and two types of areas. For example, a configuration may be adopted in which a third area is specified as a processing target in accordance with a third orientation. In this configuration, the first area may be the center area of an image, the second area may be the edge area of the image, and the third area may be an intermediate area between the center area and the edge area of the image. In addition, the shape of each area is not limited to the rectangle shape and may be a triangle shape, an ellipse shape, etc.

Also, the above-described predetermined processing is not limited to the processing of clipping a portion of a fisheye image, the processing of correcting distortion, the processing of recording and storing an image, and the processing of displaying an image, and may be, for example, image processing of providing special effects, such as contrast, gradation, and sharpness.

Moreover, in each of the above-described embodiments, the present invention has been applied to a digital camera or a notebook PC as an image processing apparatus. However, the present invention is not limited thereto, and may be applied to a PDA (Personal Digital Assistance), a tablet terminal device, a portable telephone such as a smartphone, an electronic game machine, a music player, and the like.

Furthermore, the "devices" or the "sections" described in the above-described embodiments are not required to be in a single housing and may be separated into a plurality of housings by function. In addition, the steps in the above-described flowcharts are not required to be processed in time-series, and may be processed in parallel, or individually and independently.

Still further, in each of the above-described embodiments, the present invention has been described using a fisheye image as a target. However, the present invention is not limited thereto, and may be applied in the case of a normal image or a wide angle image.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising:
a CPU which is configured to:
(i) set, as a first area, an area that is not a peripheral edge area in a captured image acquired by an imaging unit, (ii) set an area including the peripheral edge area as a second area, and (iii) perform predetermined processing on one of the first area and the second area; and
specify whether the first area is subjected to the predetermined processing or the second area is subjected to the predetermined processing, based on orientation information indicating an orientation of the imaging unit when the captured image is acquired;
wherein the CPU specifies whether the first area is subjected to the predetermined processing or the second area is subjected to the predetermined processing, based on whether the orientation information indicates that the imaging unit is in (i) a first orientation in which an angle formed between an optical axis direction of the imaging unit and a gravity direction is substantially 90 degrees when the captured image is acquired, or (ii) a second orientation in which an angle formed between the optical axis direction and the gravity direction is substantially 180 degrees when the captured image is acquired.

2. The image processing apparatus according to claim 1, further comprising:
a detection unit which detects the orientation information indicating the orientation of the imaging unit,
wherein the CPU specifies whether the first area is subjected to the predetermined processing or the second area is subjected to the predetermined processing, based on the orientation information detected by the detection unit.

3. The image processing apparatus according to claim 1, wherein the CPU is further configured to acquire a captured image to which the orientation information indicating the orientation of the imaging unit during image capturing has been added,
wherein the CPU specifies whether the first area is subjected to the predetermined processing or the second area is subjected to the predetermined processing, based on the orientation information added to the acquired captured image.

4. The image processing apparatus according to claim 1, wherein the CPU specifies the first area as a target of the predetermined processing, when the CPU judges based on the orientation information that the imaging unit is in the first orientation in which the angle formed between the optical axis direction of the imaging unit is substantially 90 degrees when the captured image is acquired,
wherein the CPU judges that the angle formed between the optical axis direction of the imaging unit and the gravity direction is substantially 90 degrees when the angle formed between the optical axis direction of the imaging unit and the gravity direction falls within an allowable angle range from an angle of 90 degrees with respect to the gravity direction.

5. The image processing apparatus according to claim 4, wherein the CPU, when the imaging unit is judged to be in the first orientation based on the orientation information, specifies one of the first area having a first shape and the first area having a second shape as the target of the predetermined processing, based on a rotation status of the imaging unit when the captured image is acquired.

6. The image processing apparatus according to claim 4, wherein the CPU, when the imaging unit is judged to be in the first orientation based on the orientation information, specifies (i) one of the first area having a first shape and the first area having a second shape or (ii) the second area as the target of the predetermined processing, based on a rotation status of the imaging unit when the captured image is acquired.

7. The image processing apparatus according to claim 1, wherein the CPU specifies the second area as a target of the predetermined processing, when the CPU judges based on the orientation information that the imaging unit is in the second orientation in which the angle formed between the optical axis direction of the imaging unit is substantially 180 degrees when the captured image is acquired,
wherein the CPU judges that the angle formed between the optical axis direction of the imaging unit and the gravity direction is substantially 180 degrees when the angle formed between the optical axis direction of the imaging unit and the gravity direction falls within an allowable angle range from an angle of 180 degrees with respect to the gravity direction.

8. The image processing apparatus according to claim 3, further comprising:
a display which displays the captured image acquired by the CPU,
wherein the CPU is further configured to cause the specified one of the first area and the second area to be displayed on the display such that the specified one of the first area and the second area is identifiable.

9. The image processing apparatus according to claim 3, wherein the CPU performs processing for recording and storing an image in the first area in the acquired captured image when the first area is specified as a processing target, or performs processing for recording and storing the second area in the acquired captured image when the second area is specified as a processing target.

10. The image processing apparatus according to claim 3, wherein the CPU performs processing for clipping an image in the first area in the acquired captured image when the first area is specified as a processing target.

11. The image processing apparatus according to claim 1, wherein the CPU performs processing for correcting distortion of an image in the one of the first area and the second area specified as a target of the predetermined processing.

12. The image processing apparatus according to claim 1, wherein the CPU performs processing for performing panorama development of an image in the specified one of the first area and the second area.

13. The image processing apparatus according to claim 1, wherein the CPU performs processing for outputting an image in the specified one of the first area and the second area.

14. The image processing apparatus according to claim 2, wherein the CPU, when one of the first area and the second area is selected as a target of the predetermined processing by a user operation, specifies the selected one of the first area and the second area as a processing target corresponding to the orientation on condition that the selected one of the first area and the second area is not unstable for the orientation.

15. The image processing apparatus according to claim 1, wherein the CPU is further configured to recognize a position of a specific photographic subject in the specified one of the first area and the second area, and move the specified one of the first area and the second area in accordance with the position of the photographic subject.

16. An image processing method for an image processing apparatus, comprising:
setting, as a first area, an area that is not a peripheral edge area in a captured image acquired by an imaging unit;
setting an area including the peripheral edge area as a second area;
performing predetermined processing on one of the first area and the second area; and
specifying whether the first area is subjected to the predetermined processing or the second area is subjected to the predetermined processing based on orientation information indicating an orientation of the imaging unit when the captured image is acquired;
wherein whether the first area is subjected to the predetermined processing or the second area is subjected to the predetermined processing is specified based on whether the orientation information indicates that the imaging unit is in (i) a first orientation in which an angle formed between an optical axis direction of the imaging unit and a gravity direction is substantially 90 degrees when the captured image is acquired, or (ii) a second orientation in which an angle formed between the optical axis direction and the gravity direction is substantially 180 degrees when the captured image is acquired.

17. The image processing method according to claim 16, further comprising:
acquiring the orientation information indicating the orientation of the imaging unit when the captured image is acquired;
judging whether the acquired orientation information indicates that the imaging unit is in (i) the first orientation in which the angle formed between the optical axis direction of the imaging unit and the gravity direction is substantially 90 degrees when the captured image is acquired, or (ii) the second orientation in which the angle formed between the optical axis direction and the gravity direction is substantially 180 degrees when the captured image is acquired, wherein it is judged that the angle formed between the optical axis direction of the imaging unit and the gravity direction is substantially 90 degrees when the angle formed between the optical axis direction of the imaging unit and the gravity direction falls within an allowable angle range from an angle of 90 degrees with respect to the gravity direction, and it is judged the angle formed between the optical axis direction of the imaging unit and the gravity direction is substantially 180 degrees when the angle formed between the optical axis direction of the imaging unit and the gravity direction falls within an allowable angle range from an angle of 180 degrees with respect to the gravity direction, wherein the first area in the captured image is specified as a target of the predetermined processing when the first orientation is acquired as the orientation information, and the second area in the captured image is specified as a target of the predetermined processing when the second orientation is acquired as the orientation information.

18. A non-transitory computer-readable storage medium having stored thereon a program that is executable by a computer in an image processing apparatus, the program being executable by the computer to actualize functions comprising:

setting, as a first area, an area that is not a peripheral edge area in a captured image acquired by an imaging unit;

setting an area including the peripheral edge area as a second area;

performing predetermined processing on one of the first area and the second area; and specifying whether the first area is subjected to the predetermined processing or the second area is subjected to the predetermined processing based on orientation information indicating an orientation of the imaging unit when the captured image is acquired, wherein whether the first area is subjected to the predetermined processing or the second area is subjected to the predetermined processing is specified based on whether the orientation information indicates that the imaging unit is in (i) a first orientation in which an angle formed between an optical axis direction of the imaging unit and a gravity direction is substantially 90 degrees when the captured image is acquired, or (ii) a second orientation in which an angle formed between the optical axis direction and the gravity direction is substantially 180 degrees when the captured image is acquired.

19. The non-transitory computer-readable storage medium according to claim 18, wherein the program is executable by the computer to actualize the functions further comprising:

acquiring the orientation information indicating the orientation of the imaging unit when the captured image is acquired;

judging whether the acquired orientation information indicates that the imaging unit is in (i) the first orientation in which the angle formed between the optical axis direction of the imaging unit and the gravity direction is substantially 90 degrees when the captured image is acquired, or (ii) the second orientation in which the angle formed between the optical axis direction and the gravity direction is substantially 180 degrees when the captured image is acquired, wherein it is judged that the angle formed between the optical axis direction of the imaging unit and the gravity direction is substantially 90 degrees when the angle formed between the optical axis direction of the imaging unit and the gravity direction falls within an allowable angle range from an angle of 90 degrees with respect to the gravity direction, and it is judged that the angle formed between the optical axis direction of the imaging unit and the gravity direction is substantially 180 degrees when the angle formed between the optical axis direction of the imaging unit and the gravity direction falls within an allowable angle range from an angle of 180 degrees with respect to the gravity direction, wherein the first area in the captured image is specified as a target of the predetermined processing when the first orientation is acquired as the orientation information, and the second area in the captured image is specified as a target of the predetermined processing when the second orientation is acquired as the orientation information.

* * * * *